United States Patent
Chen et al.

(10) Patent No.: US 9,204,434 B2
(45) Date of Patent: Dec. 1, 2015

(54) ENHANCED SOUNDING REFERENCE SIGNAL (SRS) OPERATION

(71) Applicant: QUALCOMM Incorporated, San Diego, CA (US)

(72) Inventors: Wanshi Chen, San Diego, CA (US); Peter Gaal, San Diego, CA (US); Hao Xu, San Diego, CA (US); Stefan Geirhofer, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 177 days.

(21) Appl. No.: 13/756,070

(22) Filed: Jan. 31, 2013

(65) Prior Publication Data

US 2013/0242895 A1  Sep. 19, 2013

Related U.S. Application Data

(60) Provisional application No. 61/612,942, filed on Mar. 19, 2012.

(51) Int. Cl.
| | |
|---|---|
| *H04W 72/04* | (2009.01) |
| *H04W 72/10* | (2009.01) |
| *H04B 7/04* | (2006.01) |
| *H04B 1/00* | (2006.01) |
| *H04L 5/00* | (2006.01) |
| *H04L 25/02* | (2006.01) |
| *H04W 72/12* | (2009.01) |

(52) U.S. Cl.
CPC ............. *H04W 72/042* (2013.01); *H04B 1/005* (2013.01); *H04B 1/0064* (2013.01); *H04B 7/0404* (2013.01); *H04B 7/046* (2013.01); *H04L 5/0035* (2013.01); *H04L 5/0051* (2013.01); *H04L 5/0094* (2013.01); *H04W 72/04* (2013.01); *H04W 72/0473* (2013.01); *H04W 72/10* (2013.01); *H04L 25/0224* (2013.01); *H04W 72/12* (2013.01)

(58) Field of Classification Search
None
See application file for complete search history.

(56) References Cited

U.S. PATENT DOCUMENTS

| | | | | |
|---|---|---|---|---|
| 2011/0171964 | A1* | 7/2011 | Lin et al. | 455/450 |
| 2011/0200143 | A1* | 8/2011 | Koo et al. | 375/299 |
| 2012/0039273 | A1* | 2/2012 | Nam et al. | 370/329 |
| 2012/0093119 | A1 | 4/2012 | Kim et al. | |
| 2012/0120826 | A1 | 5/2012 | Hao et al. | |
| 2012/0147845 | A1 | 6/2012 | Park et al. | |

(Continued)

OTHER PUBLICATIONS

Author Unknown, Summary of email discussion on simultaneous PUSCH/PUCCH/SRS, R1-110464, 3GPP TSG-RAN1#63bis, Jan. 21, 2011, pp. 1-15.*

(Continued)

*Primary Examiner* — Christopher Crutchfield
(74) *Attorney, Agent, or Firm* — Seyfarth Shaw LLP

(57) ABSTRACT

A method of wireless communication includes determining how to handle a collision between the first sounding reference signal (SRS) and a second SRS when the second SRS may the same type as the first SRS and when both the first SRS and the second SRS may be transmitted in a same cell. The method also includes transmitting the first SRS and the second SRS based on a received first and second configuration for SRSs. The first configuration includes a first UE specific cell identification that differs from a second UE specific cell identification of the second configuration and/or a first power offset that differs from a second power offset of the second configuration.

42 Claims, 11 Drawing Sheets

(56) References Cited

U.S. PATENT DOCUMENTS

2012/0252474 A1 10/2012 Tiirola et al.
2012/0257582 A1 10/2012 Damnjanovic et al.
2013/0242911 A1* 9/2013 Heo et al. ...................... 370/329

OTHER PUBLICATIONS

Author Unknown, SRS transmission with PUSCH/PUCCH/SRS, R1-110046, 3GPP TSG RAN WG1 Meeting #63bis, Jan. 21, 2011, pp. 1-3.*
Author Unknown, Configuration for Dynamic Aperiodic SRS Triggering, R1-105995, 3GPP TSG RAN WG1 Meeting #63. Nov. 19, 2010, pp. 1-5.*
Author Unknown, On the details of dynamic aperiodic SRS, 3GPP TSG-RAN WG1 Meeting No. 62, Aug. 27, 2010, pp. 1-6.*
Catt: "SRS enhancement for CoMP," 3GPP Draft; R1-120107t 3rd Generation Partnership Project (3GPP) Mobile Competence Centre ; 650 Route Des Lucioles; F-06921 Sophia-Antipolis Cedex; France vol. Ran WG1t No. Dresden Germany; 20120206-20120210t Jan. 31, 2012 XP050562687.
Fujitsu: "Consideration on SRS enhancement for CoMP", 3GPP Draft; R1-120748 Consideration on SRS Enhancement for Comp, 3rd Generation Partnership Project (3GPP), Mobile Competence Centre; 650, Route Des Lucioles; F-06921 Sophia-Antipolis Cedex; France, vol. RAN WG1, No. Dresden, Germany; 20120206-20120210, Feb. 1, 2012, XP050563273.
Huawei: "Reliability analysis and possible solutions on SRS for LTE-A," 3GPP Draft; R1-094708t 3rd Generation Partnership Project (3GPP), Mobile Competence Centre; 650 Route Des Lucioles; F-06921 Sophia-Antipolis Cedex; France, No. Jeju; 20091109, Nov. 9, 2009 XP050389108.
International Search Report and Written Opinion—PCT/US2013/024463—ISA/EPO—Aug. 26, 2013.
LG Electronics: "Remaining Issues on Dynamic Aperiodic Sounding for LTE-A," 3GPP Draft; R1-110851 UL SRS LGE 3rd generation Partnership Project (3GPP) Mobile Competence Centre; 650 Route Des Lucioles; F-06921 Sophia-Antipolis Cedex; France—vol. RAN WG1t No. Taipei Taiwan; 20110221 Feb. 15, 2011 XP050490621.
Partial International Search Report—PCT/US2013/024463—ISA/EPO—Jun. 6, 2013.
Alcatel-Lucent: "Configuration for Dynamic Aperiodic SRS Triggering", 3GPP TSG RAN WG1 Meeting #63, Nov. 15-19, 2010, R1-105995, pp. 1-5.
Catt: "SRS transmission with PUSCH/PUCCH/SRS", 3GPP TSG RAN WG1 Meeting #63bis, Jan. 17-21, 2011, R1-110046, pp. 1-3.
Fujitsu: "Summary of email discussion on simultaneous PUSCH/PUCCH/SRS", 3GPP TSG-RAN1#63bis, Jan. 17-21, 2011, R1-110464, pp. 1-15.

* cited by examiner

ENHANCED SOUNDING REFERENCE SIGNAL (SRS) OPERATION

CROSS-REFERENCE TO RELATED APPLICATION

This application claims the benefit under 35 U.S.C. §119 (e) to U.S. Provisional Patent Application No. 61/612,942 entitled "ENHANCED SOUNDING REFERENCE SIGNAL (SRS) OPERATION," filed on Mar. 19, 2012, the disclosure of which is expressly incorporated by reference herein in its entirety.

BACKGROUND

1. Field

Aspects of the present disclosure relate generally to wireless communication systems, and more particularly to enhancing the operation of sounding reference signals.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (downlink), SC-FDMA on the uplink (uplink), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

According to an aspect of the present disclosure, a UE determines how to handle a collision between the first sounding reference signal (SRS) and a second SRS when the second SRS may be the same type as the first SRS and also when both the first SRS and the second SRS may be transmitted in a same cell. The UE may also transmit the first SRS and the second SRS based on a received first and second configuration for SRSs. The first configuration includes a first UE specific cell identification that differs from a second UE specific cell identification of the second configuration and/or a first power offset that differs from a second power offset of the second configuration.

According to one aspect of the present disclosure, a method of wireless communication is presented. The method includes receiving a first configuration for a first sounding reference signal (SRS). The method also includes receiving a second configuration for a second SRS, the second SRS being of a same type as the first SRS and transmitted in a same cell. The method further includes determining how to handle a collision between the first SRS and the second SRS.

According to another aspect of the present disclosure, a method of wireless communication is presented. The method includes receiving a first configuration for a first sounding reference signal (SRS). The method also includes receiving a second configuration for a second SRS, the first configuration comprising a first UE specific cell identification that differs from a second UE specific cell identification of the second configuration and/or a first power offset that differs from a second power offset of the second configuration. The method further includes transmitting the first SRS and/or the second SRS.

According to yet another aspect of the present disclosure, an apparatus for wireless communication is presented. The apparatus includes means for receiving a first configuration for a first sounding reference signal (SRS). The apparatus further includes means for receiving a second configuration for a second SRS, the second SRS being of a same type as the first SRS and transmitted in a same cell. The apparatus also includes means for determining how to handle a collision between the first SRS and the second SRS.

According to still yet another aspect of the present disclosure, an apparatus for wireless communication is presented. The apparatus includes means for receiving a first configuration for a first sounding reference signal (SRS). The apparatus also includes means for receiving a second configuration for a second SRS, the first configuration comprising a first UE specific cell identification that differs from a second UE specific cell identification of the second configuration and/or a first power offset that differs from a second power offset of the second configuration. The apparatus further includes means for transmitting the first SRS and/or the second SRS.

According to another aspect of the present disclosure, a computer program product for wireless communications is presented. The computer program product includes a non-transitory computer-readable medium having program code recorded thereon. The program code includes program code to receive a first configuration for a first sounding reference signal (SRS). The program code also includes program code to receive a second configuration for a second SRS, the second SRS being of a same type as the first SRS and transmitted in a same cell. The program code further includes program code to determine how to handle a collision between the first SRS and the second SRS.

According to yet another aspect of the present disclosure, a computer program product for wireless communications is presented. The computer program product includes a non-transitory computer-readable medium having program code recorded thereon. The program code includes program code to receive a first configuration for a first sounding reference signal (SRS). The program code also includes program code to receive a second configuration for a second SRS, the first configuration comprising a first UE specific cell identification that differs from a second UE specific cell identification of the second configuration and/or a first power offset that differs from a second power offset of the second configuration. The program code further includes program code to transmit the first SRS and/or the second SRS.

According to still yet another aspect of the present disclosure, an apparatus for wireless communications is presented. The apparatus includes a memory and a processor(s) coupled to the memory. The processor(s) is configured to receive a first configuration for a first sounding reference signal (SRS). The processor is further configured to receive a second configuration for a second SRS, the second SRS being of a same type as the first SRS and transmitted in a same cell. The processor is also configured to determine how to handle a collision between the first SRS and the second SRS.

According to yet another aspect of the present disclosure, an apparatus for wireless communications is presented. The apparatus includes a memory and a processor(s) coupled to the memory. The processor is configured to receive a first configuration for a first sounding reference signal (SRS). The processor is also configured to receive a second configuration for a second SRS, the first configuration comprising a first UE specific cell identification that differs from a second UE specific cell identification of the second configuration and/or a first power offset that differs from a second power offset of the second configuration. The processor is further configure to transmit the first SRS and/or the second SRS.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
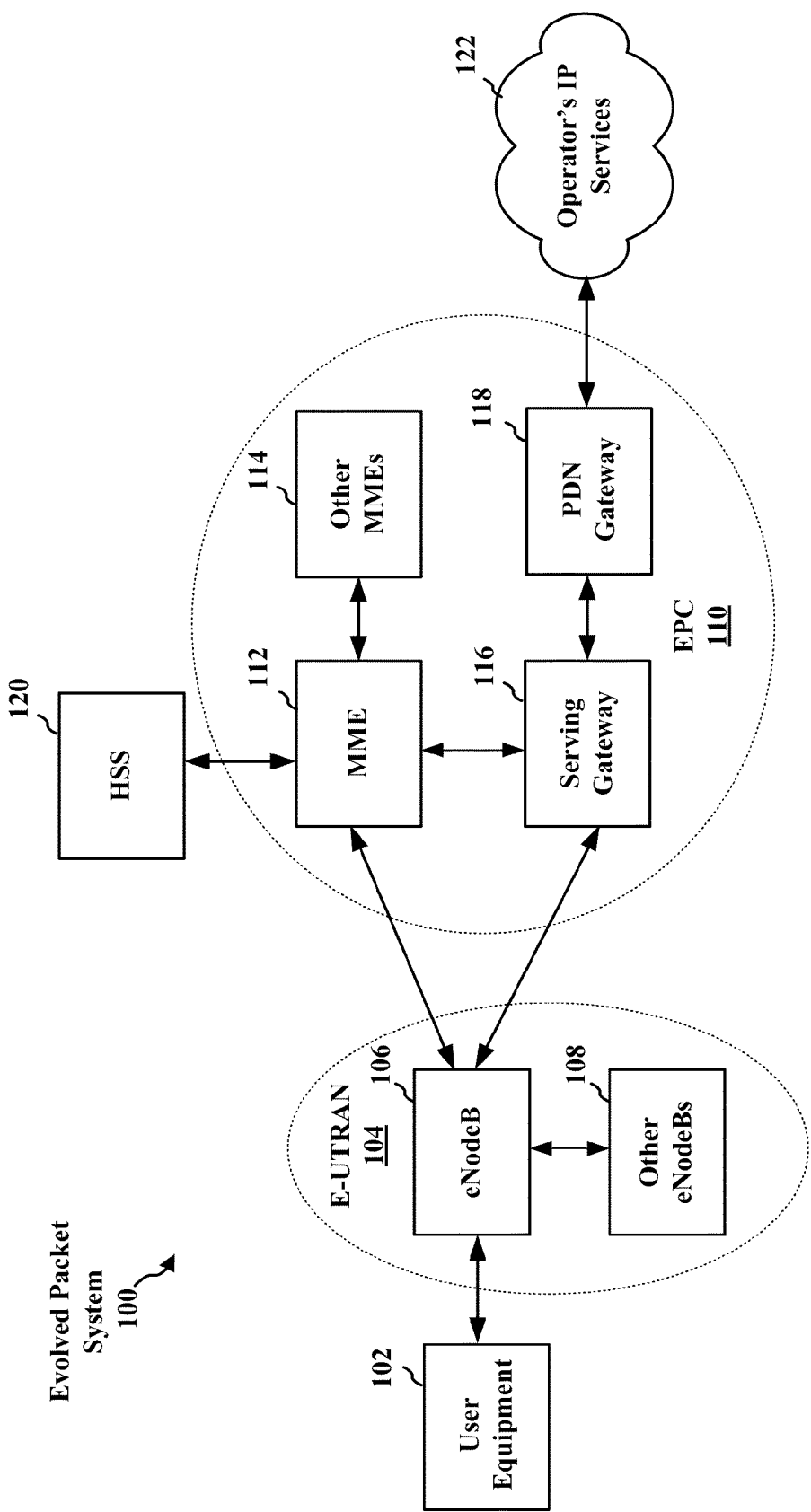
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via an X2 interface (e.g., backhaul). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected by an Si interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
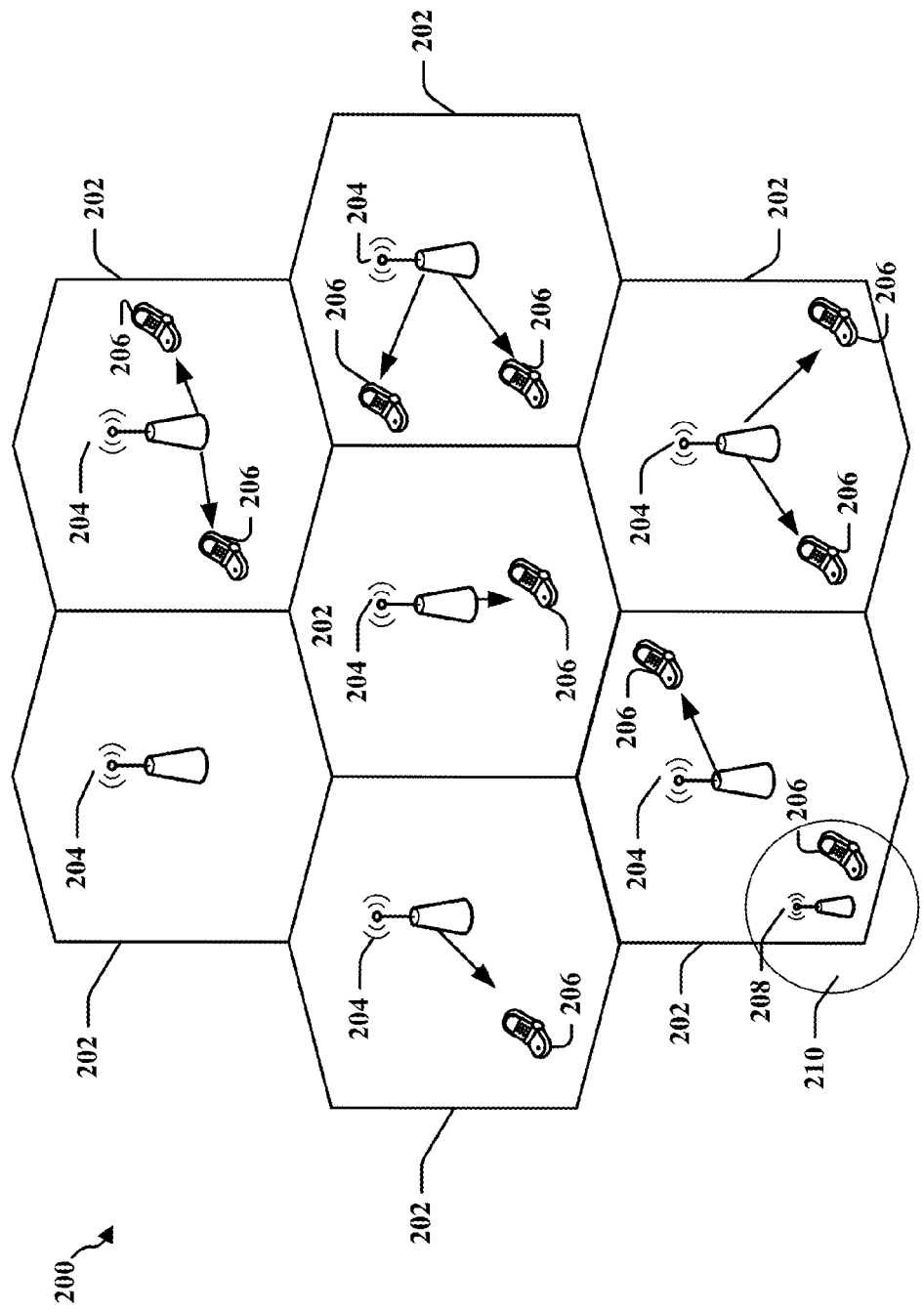
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. A lower power class eNodeB 208 may be referred to as a remote radio head (RRH). The lower power class eNodeB 208 may be a femto cell (e.g., home eNodeB (HeNodeB)), pico cell, or micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
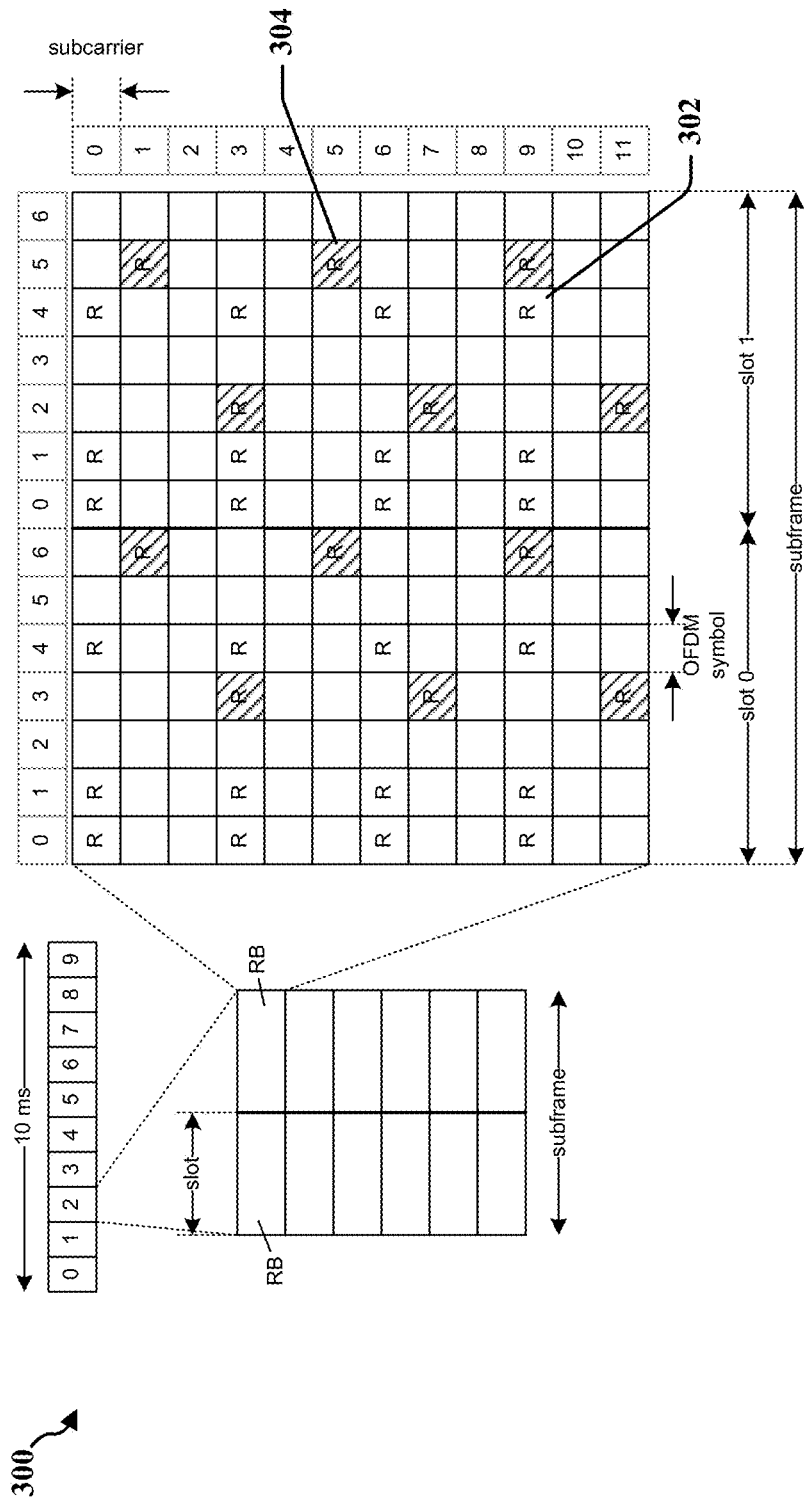
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (downlink-RS). The downlink-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
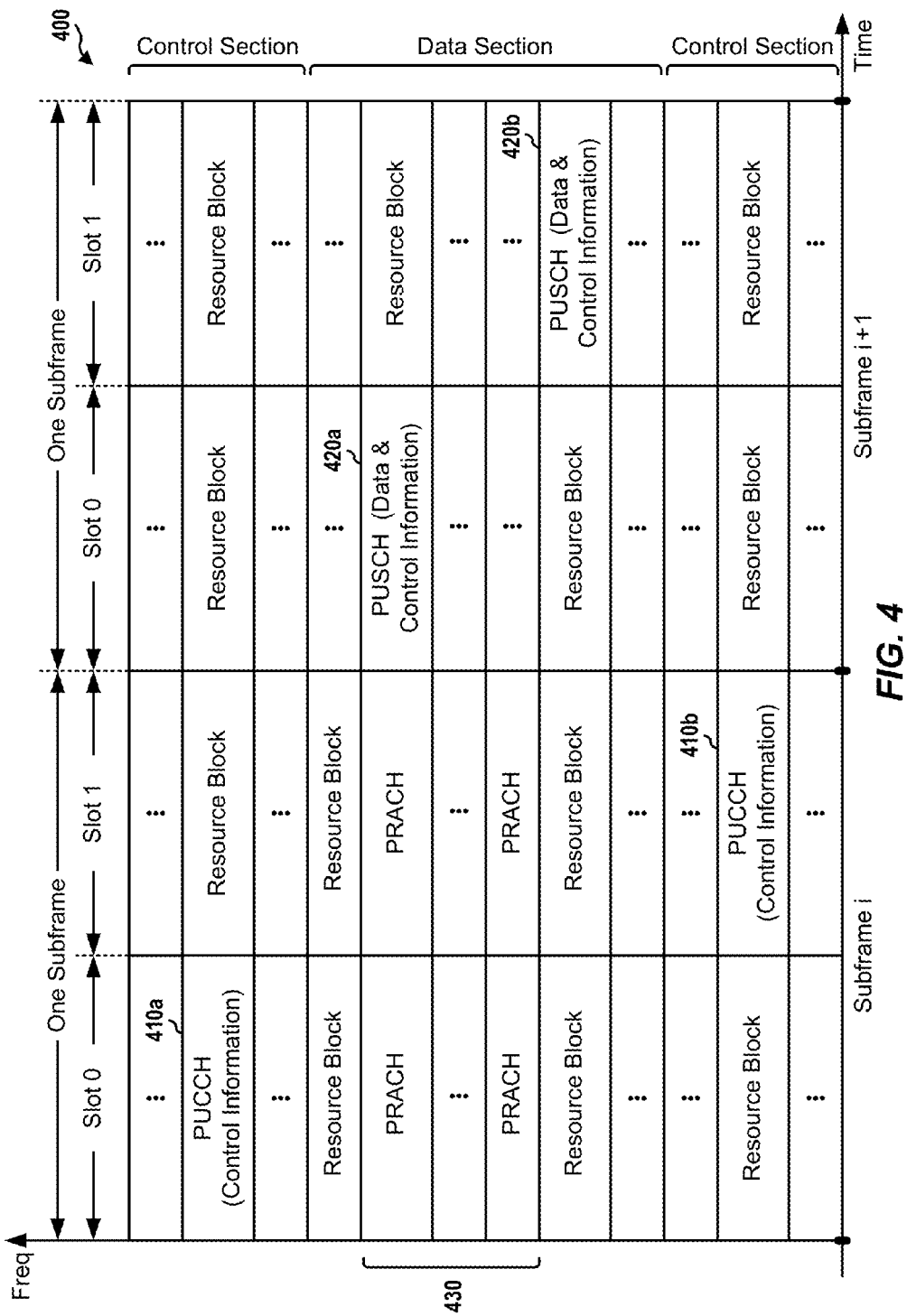
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. A uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
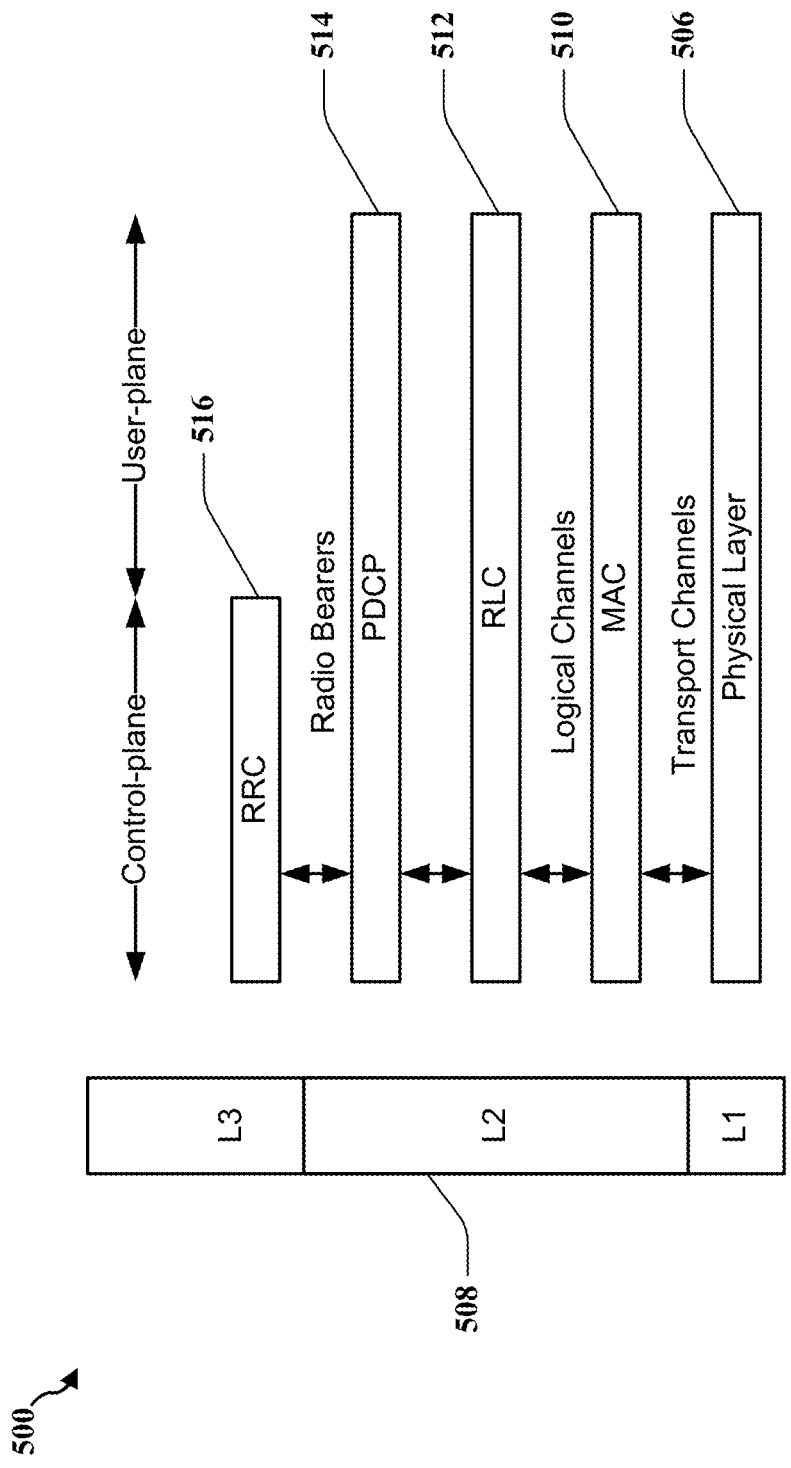
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
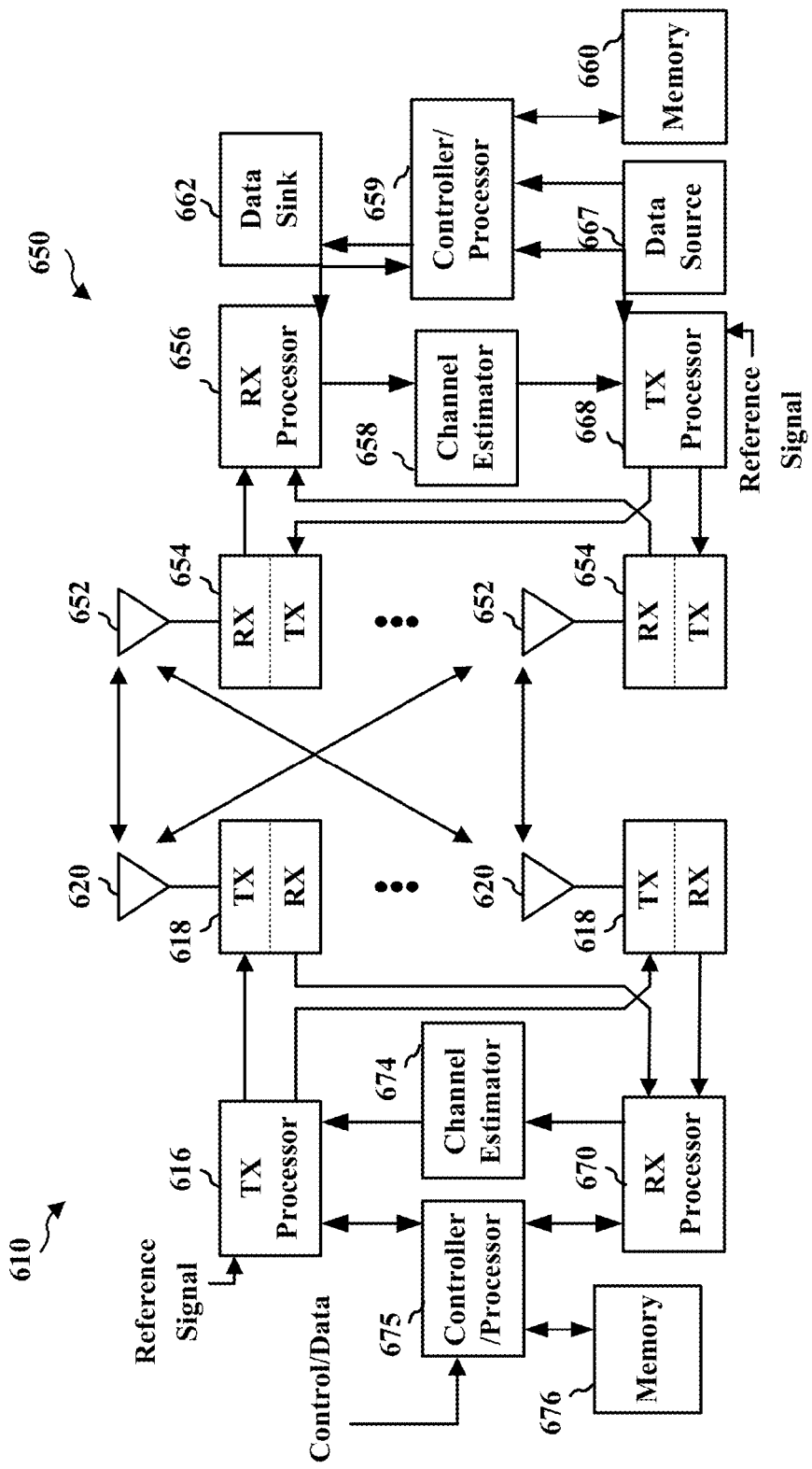
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations Enhanced Sounding Reference Signal (SRS)

There have been ongoing efforts for enhancing and supporting coordinated multiple point (CoMP) transmission and reception in LTE systems. CoMP generally refers to coordinated transmissions or receptions among different transmitters or receivers. Various CoMP schemes may be specified, such as coordinated scheduling/coordinated beamforming (CS/CB), dynamic point selection (DPS), and/or coherent or non-coherent joint transmission (JT).

CoMP may be used in various deployment scenarios. For example, in a homogenous network, CoMP may be used across cells of the same macro site. As another example, in a homogenous network, CoMP may be used across three neighboring macro sites. In a heterogeneous network, CoMP may be used across a macro cell and pico cells/remote radio heads (RRHs). In one case, the macro cell and the pico cells/RRHs are configured with different cell IDs. In another case, the macro cell and pico cells/RRHs are configured with the same cell IDs. The use of CoMP across a macro cell and pico cells configured with the same cell IDs may reduce the dependency on physical cell IDs.

It is understood that in a wireless system, a sounding reference signal (SRS) may be used in managing uplink link adaptation, downlink scheduling under channel reciprocity, and/or CoMP operation. LTE Release 10 supports both periodic and aperiodic SRS. Reference signals transmitted in the LTE uplink (UL) may enable the eNodeB to perform channel estimation. That is, the transmitted reference signal may enable the eNodeB to perform measurements and/or monitor a channel. For example, the eNodeB may perform measurements and/or monitor a channel to support frequency-domain scheduling.

Periodic SRS refers to a periodic SRS transmission, from a UE, for an indefinite duration until the SRS transmission is de-configured via a radio resource control (RRC) message. The periodic SRSs are transmitted in UE-specific periodic SRS subframes that are a subset of cell-specific SRS subframes.

Aperiodic SRS refers to an aperiodic SRS transmission triggered by a downlink control channel, such as the physical downlink control channel (PDCCH). The aperiodic SRS may be triggered via an uplink grant utilizing format 0 (1-bit) or format 4 (2-bits). Furthermore, the aperiodic SRS may be triggered via a downlink grant using formats 1A/2B/2C. Typically, the aperiodic SRS is transmitted once in response to a trigger and is transmitted in a UE-specific aperiodic SRS subframe(s).

The SRS may be used in managing downlink and uplink operations. For downlink CoMP, the SRS may be used for CoMP set management, and/or channel reciprocity based downlink scheduling. For uplink CoMP, the SRS may be used for rate prediction, power control, and/or uplink CoMP set management.

Typically, the SRS power is associated with an uplink channel power, such as a PUSCH power. Specifically, a single accumulative loop (f(i)) is shared by the uplink channel and the SRS. Furthermore, a UE may be configured by an eNodeB with a power offset for SRS operations. For example, different offsets may be configured for aperiodic SRS and periodic SRS. The SRS may be associated with a physical cell ID common to all UEs in a given cell.

Efforts are ongoing to enhance the SRS operation to support enhanced power control to address the different needs for downlink CoMP and uplink CoMP operations and to configure UE-specific cell IDs for the SRS. Enhanced power control may include an open-loop based solution, such as two different power offsets one for downlink and one for uplink. The enhanced power control may also include a closed-loop based solution, such as two f(i) functions, one for downlink and one for uplink. Furthermore, the enhanced power control may include a combination of an open-loop based solution and the closed-loop based solution.

Aspects of the present disclosure are directed to enhanced SRS operation. According to one aspect, SRS transmissions, such as SRS transmissions intended for downlink operations and uplink operations, may use different antenna ports. Specifically, the SRS transmissions may have separate antenna port configurations for downlink operations and separate configurations for uplink operations. Moreover, the different antenna port configurations may refer to a different number of antenna ports within the same logical or virtual antenna port definition. Alternatively, the different antenna ports may refer to a different logical or virtual antenna port for an SRS intended for downlink operations and uplink operations. The different antenna ports may also refer to different numbers of logical or virtual antenna ports. For example, one antenna port may be configured for SRS intended for downlink operations and two antenna ports may be configured for SRS intended for uplink operations.

When a UE receives two or more different configurations for SRS transmissions that have the same SRS type, such as periodic or aperiodic, the transmissions of the SRS for the received SRS configurations may overlap and collide. In some cases, one SRS configuration may be for the downlink and the other SRS configuration may be for the uplink. Furthermore, the SRS transmission for each SRS configuration may be transmitted in the same cell. It is desirable to configure the UE to handle the potential collision between the transmission of a first SRS and a second SRS. The present disclosure includes aspects directed to handling a collision between the SRS transmissions for two or more SRS configurations.

Figure 7A:
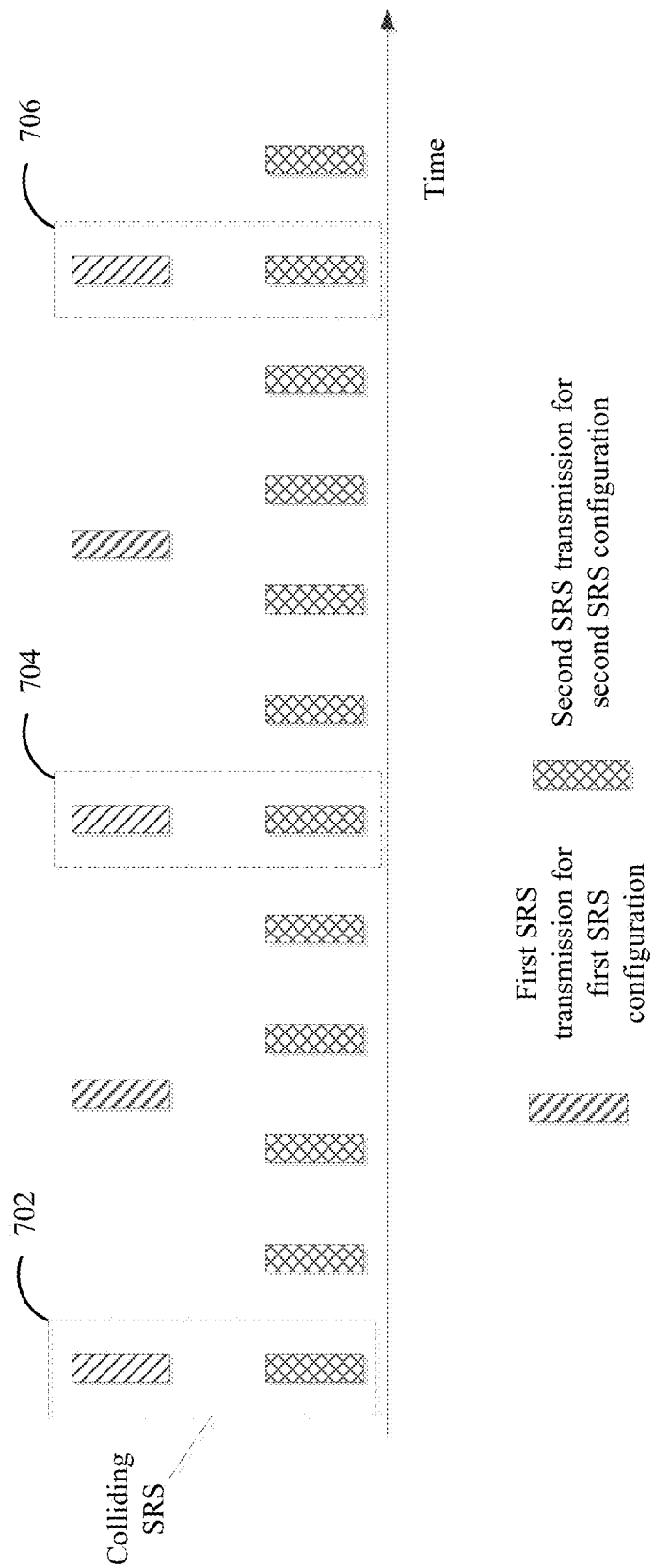
FIGS. 7A-7C are diagrams illustrating SRS transmission based on aspects of the present disclosure.

FIG. 7A illustrates an example of a collision between the SRS transmissions for two SRS configurations. As shown in FIG. 7A, a UE may have a first SRS transmission for a first SRS configuration and a second SRS transmission for a second SRS configuration. In this configuration, the first SRS configuration and the second SRS configuration are of the same type. Furthermore, as shown in FIG. 7A, at specific time instances 702, 704, and 706 the first SRS transmissions the second SRS transmissions may collide.

According to one configuration, a potential collision of SRS transmissions is treated as a mis-configuration. That is, a collision is not allowed. A UE specific implementation may be designed to prevent a collision of multiple SRS transmissions. More specifically, the UE may modify the scheduled transmission of one or more of the SRS configurations if it is determined that that SRS transmission may collide.

Figure 7B:
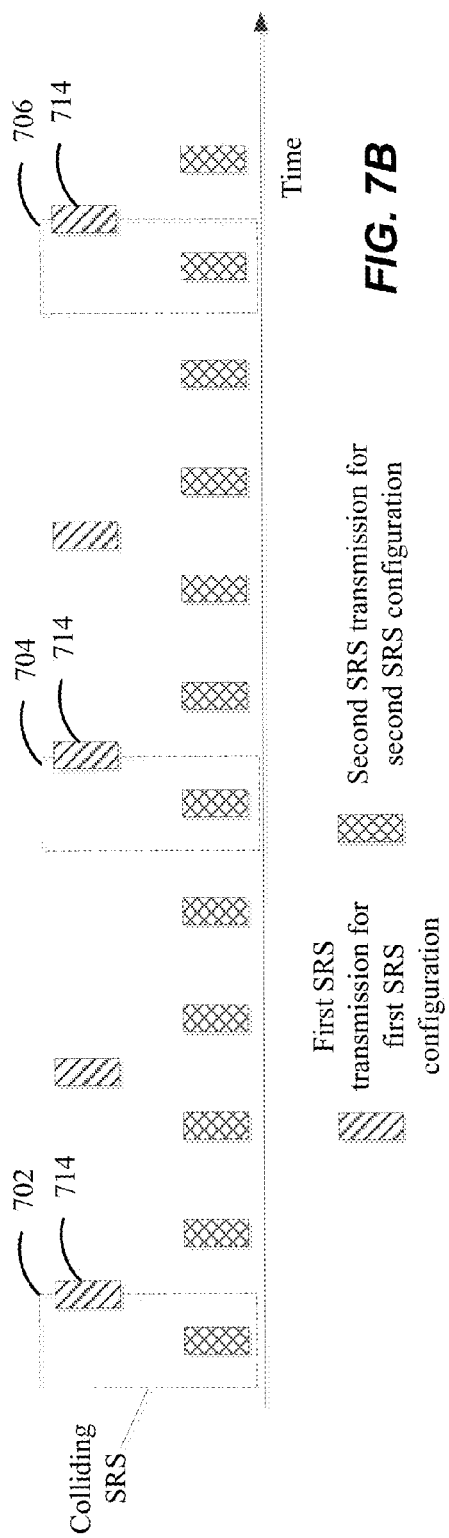

For example, based on the present configuration, the UE of FIG. 7A may modify the timing of the first SRS transmission and/or the second SRS transmission so that the SRS transmissions do not overlap at the specific 702, 704, and 706 when there may be a potential collision between the SRS transmissions. That is, as shown in FIG. 7B, the UE mitigates the potential collision by modifying the timing of the first SRS transmission 714 so that the first SRS transmission 714 does not overlap with the second SRS transmissions at the specific 702, 704, and 706 when there may be a potential collision between the SRS transmissions.

According to another configuration, when a potential collision is determined, one of the SRS transmissions is kept based on a prioritization rule. The prioritization may be defined based on a purpose of the SRS, such as whether the SRS is intended for downlink or uplink. The prioritization may also be based on SRS parameters. The SRS parameters may include a bandwidth, length of periodicity, a power offset, and/or a number of antenna ports.

Figure 7C:
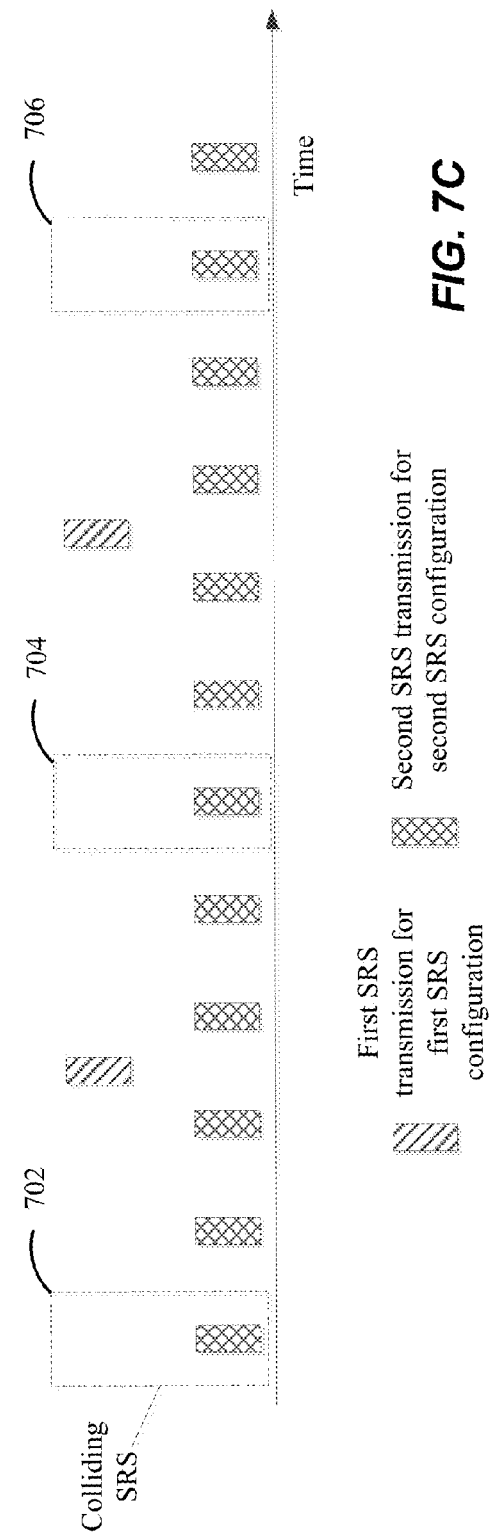

For example, based on the present configuration, when a potential collision is detected, the UE may determine the priority of the first SRS transmission and the second SRS transmission. After determining the priority of the first SRS transmission and the second SRS transmission, the UE may only transmit the SRS transmission with the highest priority so as to mitigate the potential collision. Specifically, as shown in FIG. 7C, the UE may determine that the second SRS transmission has a higher priority in comparison the first SRS transmission, therefore, at the specific times 702, 704, and 706 when there is a potential collision between the SRS transmissions, the UE only transmits the second SRS configuration.

The priority of the SRS configurations may be determined based on various factors. In one configuration, the SRS transmission with a longer periodicity may be kept. As previously discussed, FIG. 7C illustrates an example of keeping an SRS transmission for a specific SRS configuration that has a higher priority in comparison to a SRS transmission of another SRS configuration. In an alternative example to FIG. 7C, the first SRS transmission may be kept because the first SRS transmission has a longer periodicity in comparison to the second SRS transmission.

In yet another configuration, the SRS transmission with a larger power offset may be kept. In still yet another configuration, the SRS transmission with the greatest number of antenna ports may be kept. Furthermore, in one configuration, the SRS transmission with the largest bandwidth may be kept.

According to another configuration, when a potential collision is determined, both SRS transmissions may be kept if they are orthogonal. The orthogonality can be realized in a time resource (e.g., subframe), in a frequency domain, in a code domain (e.g., different cyclic shifts), or a combination thereof. Thus, in the present configuration, both SRS configurations may be kept and simultaneous transmissions in the same subframe may be allowed if the two or more SRS transmissions use different subbands, comb filters, or cyclic shifts. However, only one SRS configuration is kept based on the aforementioned prioritization rule when the two SRS configurations are not orthogonal. Furthermore, according to the present configuration, the decision to keep both SRS configurations may be UE capability dependent. That is, the decision could be similar to a clustered PUSCH resource assignment or parallel PUCCH and PUSCH operation.

According to yet another configuration, both SRS configurations may be kept if a SC-FDMA waveform can be maintained for each antenna port. Specifically, both SRS configurations may be kept if the first SRS transmission is assigned a first antenna port differentiated by a cyclic shift in comparison to a second SRS transmission of the second antenna port configuration.

According to still yet another configuration, different power control levels may be applied to different antenna ports for more flexible power management and operation. As an example, the power split among different antenna ports may not be uniform and may be based on signalling from an eNodeB.

Determining how to mitigate the potential collision of SRS transmissions may occur for each SRS transmission, regardless of the number of antenna ports configured for each set. Alternatively, determining how to mitigate the potential collision of SRS transmissions may occur for each antenna port.

It is understood that periodic SRS and aperiodic SRS may be used for different purposes. For example, periodic SRS may be used for a downlink operation and the aperiodic SRS may be used for uplink operation and vice versa. Thus, different UE-specific cell IDs may be specified for periodic SRS and aperiodic SRS for a UE for flexible multiplexing of the SRS for different purposes. For example, cell ID 1 may be assigned to periodic SRS and cell ID 2 may be assigned to aperiodic SRS. Furthermore, the cell ID may be based on a specific antenna port. That is, each antenna port may be associated with a different cell ID.

For aperiodic SRS triggering, different sets of SRS parameters can be configured and triggered based on the downlink control information (DCI) format, and/or the value of the aperiodic SRS field. For example, a DCI format 0 has one-bit aperiodic SRS triggering and a DCI format 4 has two-bit aperiodic SRS triggering. Additionally, DCI format 1A/2B/2C has one-bit aperiodic SRS triggering. Thus, in this example, it is possible to trigger up to five different sets of SRS parameters (1 set from DCI format 0, 3 sets from DCI format 4, and 1 set from DCI format 1A/2B/2C). Moreover, an enhanced PDCCH (e-PDCCH) may be further defined with different aperiodic SRS parameter sets.

According to one configuration, a cell ID may be included as part of the SRS parameter set. In this configuration, different cell IDs may be used for aperiodic SRS based on the triggering DCI format and/or the value of the aperiodic SRS field, and/or whether the triggering is from the legacy PDCCH or an enhanced PDCCH. According to another configuration, power offsets may be defined differently for different aperiodic SRS sets.

The cell ID and/or power offset may be dynamically set using information in the DCI for aperiodic SRS triggering. For example, the DCI may not be associated with a PUSCH transmission, rather, the entire DCI is dedicated to aperiodic SRS triggering such that all of the information fields in the DCI can be used to indicate the aperiodic SRS parameters.

Figure 8:
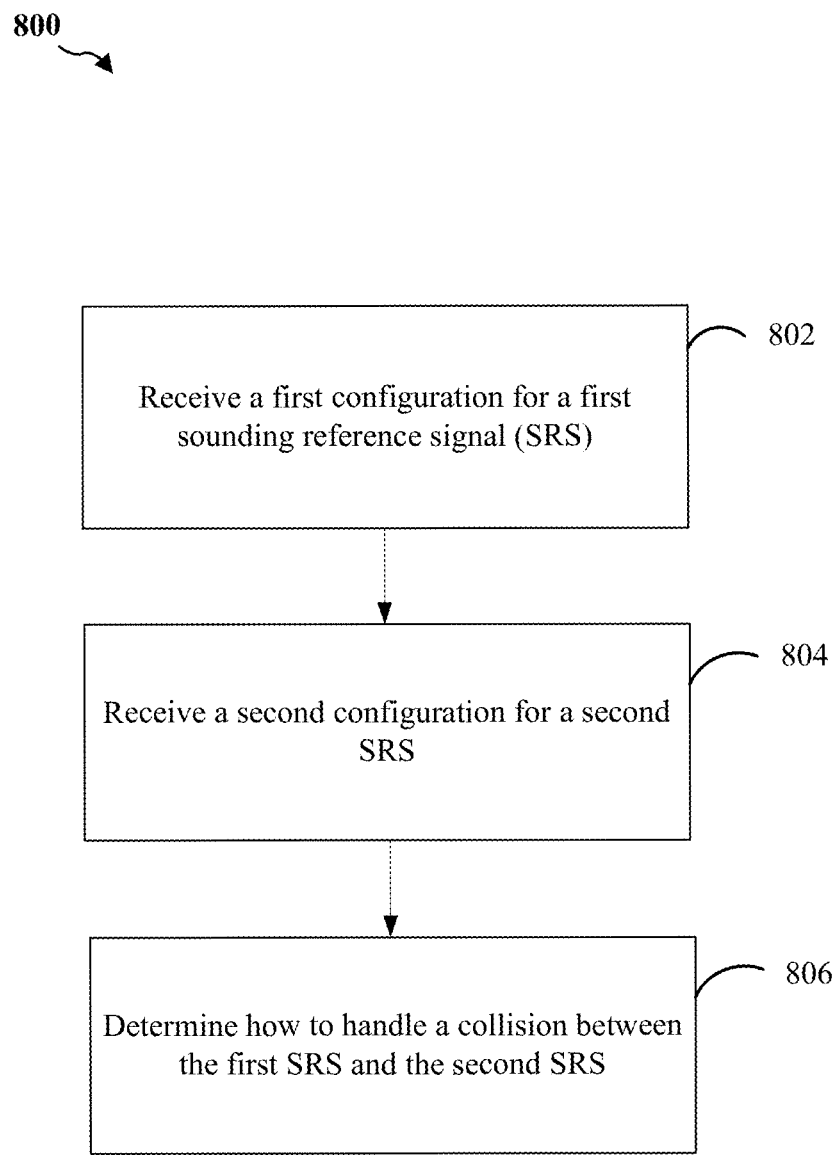
FIG. 8 is a block diagram illustrating a method for transmitting sounding reference signals via different antenna port configurations.

FIG. 8 illustrates a method 800 for configuring different SRS sets. In block 802, a UE receives a first configuration for a first sounding reference signal (SRS). The UE receives a second configuration for a second SRS in block 804. In one aspect of the present disclosure, the first SRS and the second SRS are the same type of SRS. That is, both the first and the second SRS may be a periodic SRS or both the first and the second SRS may be an aperiodic SRS. Additionally, in the present aspect, the first and second SRS are transmitted in the same cell. In another aspect of the present disclosure, the first configuration includes a first UE specific cell identification that differs from a second UE specific cell identification of the second configuration and/or the first configuration includes a first power offset that differs from a second power offset of the second configuration. In this aspect of the present disclosure, the first SRS may be a different type from the second SRS. For example, the first SRS may be an aperiodic SRS and the second SRS may be a periodic SRS.

Finally, in block 806, in one configuration, the UE determines how to handle a potential collision between the first SRS and the second SRS. The UE may determine how to handle the potential collision when the first SRS and the second SRS are the same type of SRS. In determining how to handle the collision, the UE may treat the collision as a mis-configuration. Alternatively, in determining how to handle the collision, the UE may prioritize the first configuration or the second configuration based on a purpose of the first SRS and the second SRS, a parameter of the first SRS and the second SRS, and/or a capability of the UE.

In one configuration, the UE 650 is configured for wireless communication including means for receiving a first configuration for a first SRS, and means for receiving a second configuration for a second SRS. In one aspect of the present disclosure, the receiving means for the first and second configurations may be the controller/processor 659, memory 660, receive processor 656, transmitters/receivers 654, and/or antenna 652 configured to perform the functions recited by the receiving means for the first and second configurations. The UE 650 is also configured to include means for determining how to handle a collision between the first SRS and the second SRS. In one aspect of the present disclosure, the determining means may be the controller/processor 659, and/or memory 660, configured to perform the functions recited by the determining means. In another aspect, the aforementioned means may be any module or any apparatus configured to perform the functions recited by the aforementioned means.

Figure 9:
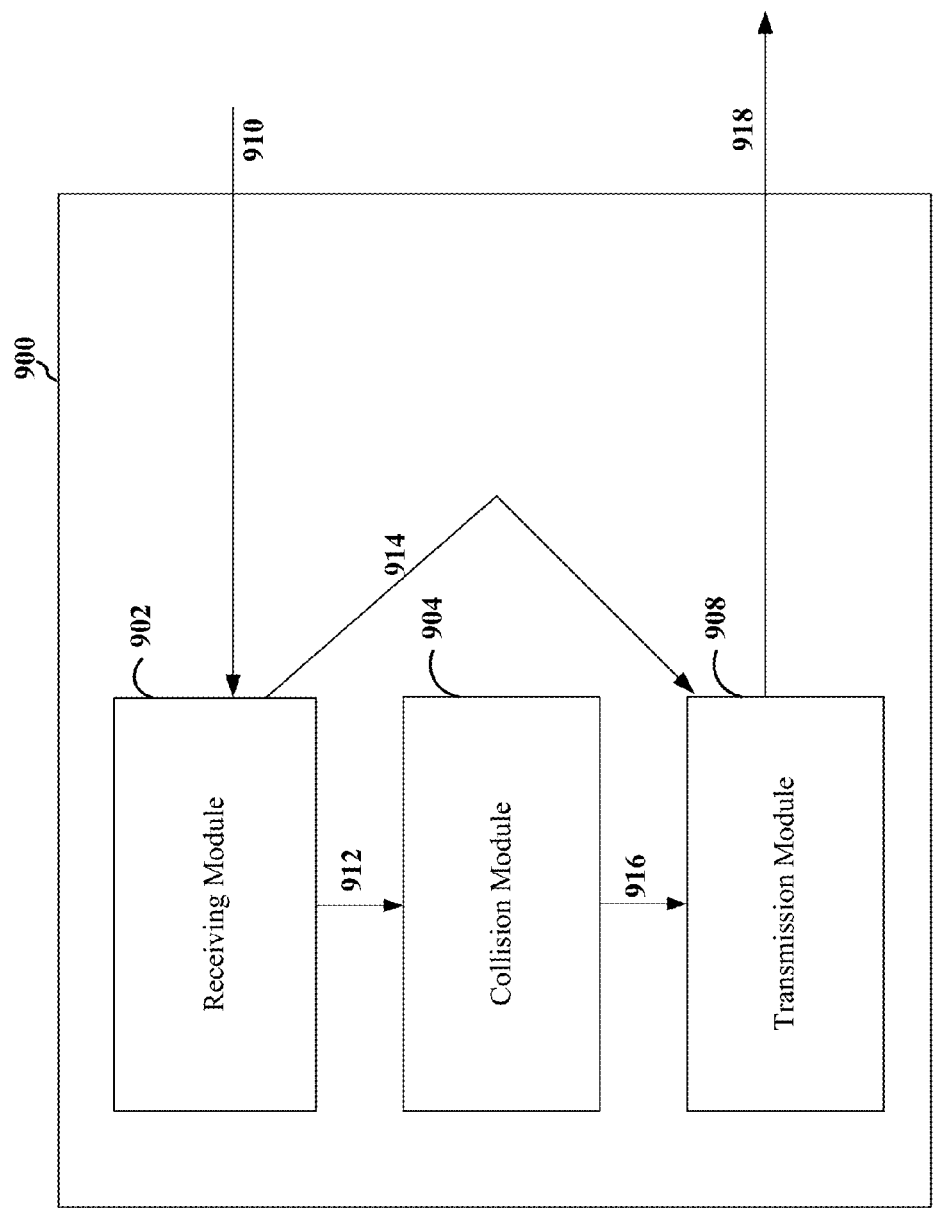
FIG. 9 is a conceptual data flow diagram illustrating the data flow between different modules/means/components in an exemplary apparatus.

FIG. 9 is a conceptual data flow diagram illustrating the data flow between different modules/means/components in an exemplary apparatus 900. The apparatus 900 includes a receiving module 902 that receives signal(s) 910 indicating a first configuration for a first SRS and a second configuration for a second SRS. In one configuration, (not shown) the receiving module 902 may be two separate modules, such as a first module for receiving the first configuration and a second module for receiving the second configuration.

In one aspect of the present disclosure, when the first SRS and the second SRS are the same type, the receiving module 902 transmits the first configuration and the second configuration to the collision module 904 via a path 912. The collision module 904 determines how to handle a potential collision between the first SRS and the second SRS. After determining how to handle the potential collision, the collision module 904 may control the transmission module 908, via a path 916, to transmit the first SRS and/or the second SRS based on the determination of how to handle the potential collision. The transmission module 908 may transmit the first SRS and the second SRS via a signal 918.

In another aspect of the present disclosure, if the first SRS and the second SRS are a different type, the receiving module 902 may control the transmission module 908, via a path 914, to transmit the first SRS and/or the second SRS. The transmission module 908 may transmit the first SRS and the second SRS via a signal 918.

The apparatus may include additional modules that perform each of the steps of the process in the aforementioned flow charts FIG. 8. As such, each block in the aforementioned flow chart FIG. 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 10:
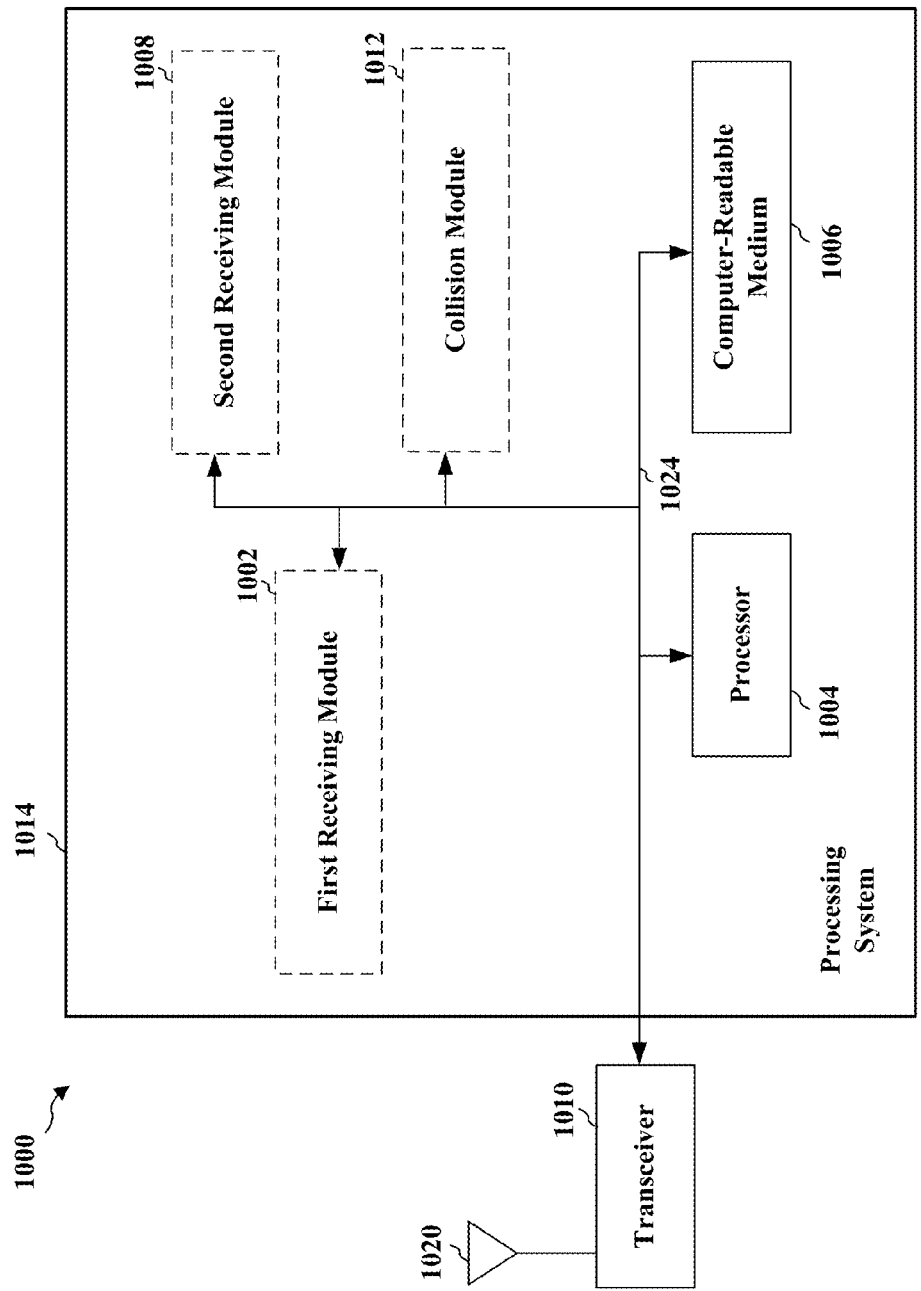
FIG. 10 is a conceptual data flow diagram illustrating the data flow between different modules/means/components in an exemplary apparatus.

FIG. 10 is a diagram illustrating an example of a hardware implementation for an apparatus 1000 employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1004 the modules 1002, 1008, 1012, and the computer-readable medium 1006. The bus 1024 may also link various other circuits such as timing sources, peripherals, voltage regulators, and power management circuits, which are well known in the art, and therefore, will not be described any further.

The apparatus includes a processing system 1014 coupled to a transceiver 1010. The transceiver 1010 is coupled to one or more antennas 1020. The transceiver 1010 enables communicating with various other apparatus over a transmission medium. The processing system 1014 includes a processor 1004 coupled to a computer-readable medium 1006. The processor 1004 is responsible for general processing, including the execution of software stored on the computer-readable medium 1006. The software, when executed by the processor 1004, causes the processing system 1014 to perform the various functions described for any particular apparatus. The computer-readable medium 1006 may also be used for storing data that is manipulated by the processor 1004 when executing software.

The processing system includes a first receiving module 1002 and a second receiving module 1008. The first receiving module 1002 can receive a first configuration for a first sounding reference signal (SRS) intended for an uplink operation. The second receiving module 1008 can receive a second configuration for a second SRS intended for a downlink operation. The first receiving module 1002 and the second receiving module 1008 may be one module (not shown) or separate modules as illustrated in FIG. 10. In one configuration, the processing system also includes a collision module 1012. The collision module 1012 determines how to handle a potential collision between the first SRS and the second SRS. The modules may be software modules running in the processor 1004, resident/stored in the computer-readable medium 1006, one or more hardware modules coupled to the processor 1004, or some combination thereof. The processing system 1014 may be a component of the UE 650 and may include the memory 660, the transmit processor 668, the receive processor 656, the transmitters/receivers 654, the antenna 652, and/or the controller/processor 659.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

Particular implementations for enhancements to SRS operations are described in attached Appendix A. Appendix A forms part of this specification and is expressly incorporated herein by reference in its entirety.

What is claimed is:

1. A method of wireless communication, the method comprising:
   receiving a first configuration for a first sounding reference signal (SRS) for managing at least uplink coordinated multiple point (CoMP) operations;
   receiving a second configuration for a second SRS for managing at least downlink CoMP operations, the second SRS being of a same type as the first SRS and transmitted in a same cell; and
   determining how to handle a potential collision between the first SRS and the second SRS.

2. The method of claim 1, in which the first SRS and the second SRS are periodic SRS transmissions.

3. The method of claim 1, in which the first SRS and the second SRS are aperiodic SRS transmissions.

4. The method of claim 1, in which the uplink CoMP operations include at least coordinated transmission management, rate predication, power control, or a combination thereof and the downlink CoMP operations include at least coordinated transmission management, channel reciprocity based downlink scheduling, or a combination thereof.

5. The method of claim 1, in which the first configuration comprises a first number of antenna ports, and the second configuration comprises a second number of antenna ports.

6. The method of claim 1, in which the first configuration comprises a first definition of antenna ports, and the second configuration comprises a second definition of antenna ports.

7. The method of claim 6, in which the first definition of antenna ports and the second definition of antenna ports include at least one shared antenna port.

8. The method of claim 1, in which the determining comprises treating any collision as a misconfiguration.

9. The method of claim 1, in which the determining comprises prioritizing the first configuration or the second configuration based on one or more of a purpose of the first SRS and the second SRS, a property of the first SRS and the second SRS, a capability of a user equipment (UE), or a combination thereof.

10. The method of claim 1, further comprising:
    transmitting the first SRS with the first configuration in a subframe; and
    transmitting the second SRS with the second configuration in the subframe when the potential collision is identified and when the first configuration is orthogonal with the second configuration.

11. The method of claim 1, further comprising:
    transmitting the first SRS with the first configuration; and
    transmitting the second SRS with the second configuration when the potential collision is identified and when the first SRS and the second SRS are differentiated by cyclic shift.

12. The method of claim 1, in which the determining occurs for each SRS transmission.

13. The method of claim 1, in which the determining occurs for each antenna port.

14. A method of wireless communication, the method comprising:
    receiving a first configuration for a first sounding reference signal (SRS) for managing at least uplink coordinated multiple point (CoMP) operations;
    receiving a second configuration for a second SRS for managing at least downlink CoMP operations, the first configuration comprising at least a first UE specific cell identification that differs from a second UE specific cell identification of the second configuration, a first power offset that differs from a second power offset of the second configuration, or a combination thereof; and
    transmitting the first SRS, the second SRS, or a combination thereof.

15. The method of claim 14, in which each UE cell specific identification depends on configured antenna ports.

16. The method of claim 14, in which the first configuration corresponds to a periodic SRS transmission, and the second configuration corresponds to an aperiodic SRS transmission.

17. The method of claim 14, in which the first configuration comprises an aperiodic SRS configuration based on one or more of a downlink control information (DCI) format, an aperiodic SRS parameter in DCI format, a type of control channel, or a combination thereof.

18. The method of claim 17, in which the type of control channel further comprises one or more of a legacy control channel, a new control channel utilizing different resource regions, or a combination thereof.

19. The method of claim 14, in which the second configuration comprises one or more of an aperiodic SRS configuration based on a downlink control information (DCI) format, an aperiodic SRS parameter, a type of control channel, or a combination thereof.

20. An apparatus for wireless communication, the apparatus comprising:
    means for receiving a first configuration for a first sounding reference signal (SRS) for managing at least uplink coordinated multiple point (CoMP) operations;
    means for receiving a second configuration for a second SRS for managing at least downlink CoMP operations, the second SRS being of a same type as the first SRS and transmitted in a same cell; and
    means for avoiding a collision between the first SRS and the second SRS.

21. A apparatus for wireless communication, the apparatus comprising:
    means for receiving a first configuration for a first sounding reference signal (SRS) for managing at least uplink coordinated multiple point (CoMP) operations;
    means for receiving a second configuration for a second SRS for managing at least downlink CoMP operations, the first configuration comprising at least a first UE specific cell identification that differs from a second UE specific cell identification of the second configuration, a first power offset that differs from a second power offset of the second configuration, or a combination thereof; and
    means for transmitting the first SRS, the second SRS, or a combination thereof.

22. A non-transitory computer-readable medium having program code recorded thereon, the program code comprising:

program code to receive a first configuration for a first sounding reference signal (SRS) for managing at least uplink coordinated multiple point (CoMP) operations;
program code to receive a second configuration for a second SRS for managing at least downlink CoMP operations, the second SRS being of a same type as the first SRS and transmitted in a same cell; and
program code to determine how to handle a potential collision between the first SRS and the second SRS.

23. A non-transitory computer-readable medium having program code recorded thereon, the program code comprising:
program code to receive a first configuration for a first sounding reference signal (SRS) for managing at least uplink coordinated multiple point (CoMP) operations;
program code to receive a second configuration for a second SRS for managing at least downlink CoMP operations, the first configuration comprising at least a first UE specific cell identification that differs from a second UE specific cell identification of the second configuration, a first power offset that differs from a second power offset of the second configuration, or a combination thereof; and
program code to transmit the first SRS, the second SRS, or a combination thereof.

24. An apparatus for wireless communications, comprising:
a memory; and
at least one processor coupled to the memory, the at least one processor being configured:
to receive a first configuration for a first sounding reference signal (SRS) for managing at least uplink coordinated multiple point (CoMP) operations;
to receive a second configuration for a second SRS for managing at least downlink CoMP operations, the second SRS being of a same type as the first SRS and transmitted in a same cell; and
to determine how to handle a potential collision between the first SRS and the second SRS.

25. The apparatus of claim 24, in which the first SRS and the second SRS are periodic SRS transmissions.

26. The apparatus of claim 24, in which the first SRS and the second SRS are aperiodic SRS transmissions.

27. The apparatus of claim 24, in which the uplink CoMP operations include at least coordinated transmission management, rate predication, power control, or a combination thereof and the downlink CoMP operations include at least coordinated transmission management, channel reciprocity based downlink scheduling, or a combination thereof.

28. The apparatus of claim 24, in which the first configuration comprises a first number of antenna ports, and the second configuration comprises a second number of antenna ports.

29. The apparatus of claim 24, in which the first configuration comprises a first definition of antenna ports, and the second configuration comprises a second definition of antenna ports.

30. The apparatus of claim 29, in which the first definition of antenna ports and the second definition of antenna ports include at least one shared antenna port.

31. The apparatus of claim 24, in which the at least one processor is further configured to treat any collision as a misconfiguration.

32. The apparatus of claim 24, in which the at least one processor is further configured to prioritize the first configuration or the second configuration based on one or more of a purpose of the first SRS and the second SRS, a property of the first SRS and the second SRS, a capability of a user equipment (UE), or a combination thereof.

33. The apparatus of claim 24, in which the at least one processor is further configured:
to transmit the first SRS with the first configuration in a subframe; and
to transmit the second SRS with the second configuration in the subframe when the potential collision is identified and when the first configuration is orthogonal with the second configuration.

34. The apparatus of claim 24, in which the at least one processor is further configured:
to transmit the first SRS with the first configuration; and
to transmit the second SRS with the second configuration when the potential collision is identified and when the first SRS and the second SRS are differentiated by cyclic shift.

35. The apparatus of claim 24, in which the at least one processor is further configured to determine how to handle the potential collision for each SRS transmission.

36. The apparatus of claim 24, in which the at least one processor is further configured to determine how to handle the potential collision for each antenna port.

37. An apparatus for wireless communications, comprising:
a memory; and
at least one processor coupled to the memory, the at least one processor being configured:
to receive a first configuration for a first sounding reference signal (SRS) for managing at least uplink coordinated multiple point (CoMP) operations;
to receive a second configuration for a second SRS for managing at least downlink CoMP operations, the first configuration comprising at least a first UE specific cell identification that differs from a second UE specific cell identification of the second configuration, a first power offset that differs from a second power offset of the second configuration, or a combination thereof; and
to transmit the first SRS, the second SRS, or a combination thereof.

38. The apparatus of claim 37, in which each UE cell specific identification depends on configured antenna ports.

39. The apparatus of claim 37, in which the first configuration corresponds to a periodic SRS transmission, and the second configuration corresponds to an aperiodic SRS transmission.

40. The apparatus of claim 37, in which the first configuration comprises an aperiodic SRS configuration based on one or more of a downlink control information (DCI) format, an aperiodic SRS parameter in DCI format, a type of control channel, or a combination thereof.

41. The apparatus of claim 40, in which the type of control channel further comprises one or more of a legacy control channel, a new control channel utilizing different resource regions, or a combination thereof.

42. The apparatus of claim 37, in which the second configuration comprises one or more of an aperiodic SRS configuration based on a downlink control information (DCI) format, an aperiodic SRS parameter, a type of control channel, or a combination thereof.

* * * * *